Feb. 11, 1969 P. J. DONALD 3,427,631
LIGHT BEAM RECORDER USING VIBRATED LENS SYSTEM
Filed Feb. 1, 1967
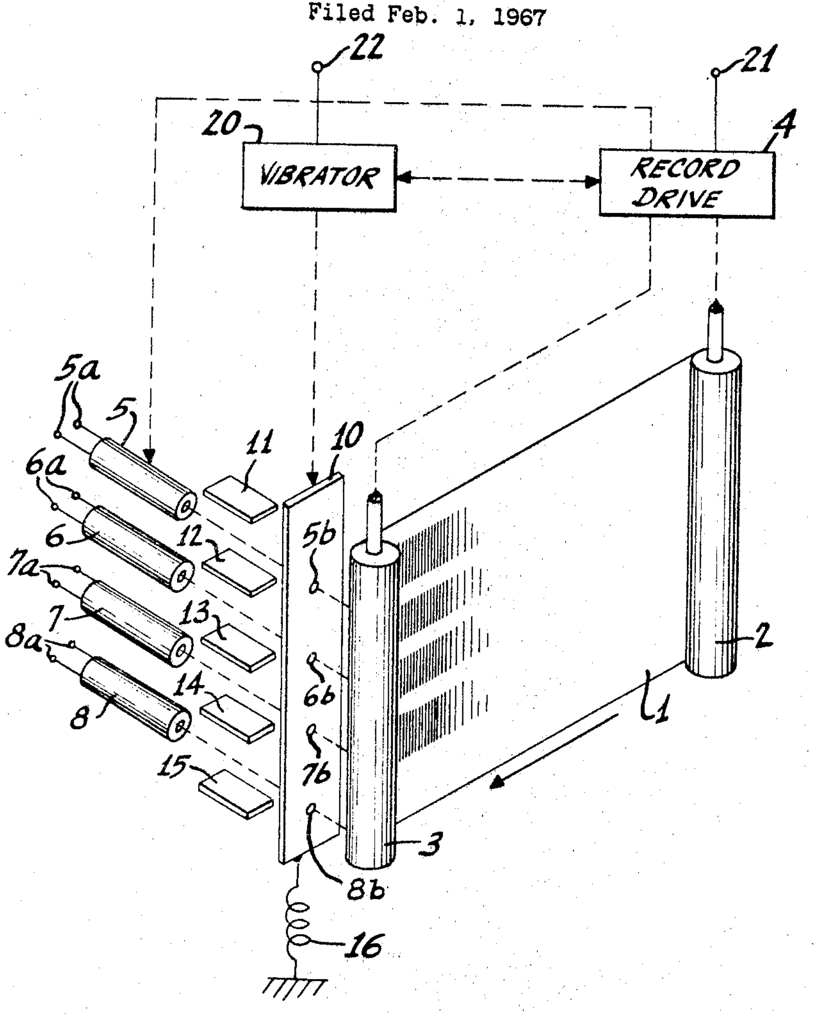
Inventor:
PHILIP J. DONALD
By John V. Regan
Attorney

United States Patent Office 3,427,631

Patented Feb. 11, 1969

3,427,631

LIGHT BEAM RECORDER USING VIBRATED LENS SYSTEM

Philip J. Donald, Princeton, N.J., assignor to Radio Corporation of America, a corporation of Delaware Filed Feb. 1, 1967, Ser. No. 613,233

U.S. Cl. 346—49 4 Claims

Int. Cl. G01d 9/42

ABSTRACT OF THE DISCLOSURE

An optical recorder having an intensity modulated light source imaged on a moving recording surface by an independently vibrated lens system to produce a compressed longitudinal recording.

*Background of the invention*

The recording of plural input signals on a single recording medium by conventional recorders is effective to produce an extensive longitudinal record which is difficult to analyze as a result of its length and is an inefficient utilization of the transverse recording surface of the medium. Further, conventional multiple channel recorders have used a recording system having expensive and complicated means for producing and displacing each of the recording traces on the recording medium, e.g., moving coil and mirror combinations for each channel.

*Summary of the invention*

An object of the present invention is to provide an improved multiple channel recording apparatus.

Another object of the present invention is to provide an improved recorder for producing a compressed longitudinal trace recording.

A further object of the present invention is to provide an improved recorder using a vibrating lens system to provide a recording image on a recording medium.

A still further object of the present invention is to provide an improved recorder using the combined effect of a vibrating lens system and a moving recording medium to sweep a recording image on the recording medium.

In accomplishing these and other objects, there has been provided, in accordance with the present invention, a multiple channel recorder using a lens array which is periodically vibrated over a limited physical displacement to produce a moving image on a recording medium of an input signal modulated light source for each input channel.

*Brief description of the drawing*

A better understanding of the present invention may be had when the following detailed description is read in connection with the accompanying drawing in which the single figure is a pictorial representation of a recorder embodying the present invention.

*Description of the preferred embodiment*

Referring to the single figure drawing in more detail, there is shown a recorder having a recording medium 1 in the form of a strip, e.g., film. Other forms of a recording medium 1 for the present invention may be used, e.g., a recording drum, disc, etc. The medium 1 is transported between a pair of storage rollers 2, 3 by a record drive means 4. A plurality of input light sources 5, 6, 7 and 8 are arranged to have their input terminals 5*a*, 6*a*, 7*a* and 8*a* connected to corresponding sources of input data signals. The light sources 5 to 8 may each be any suitable light device capable of providing an output light intensity proportional to a desired characteristic of an input signal applied thereto. The light output from each of the light sources 5 to 8 is brought out through a small opening at one end thereof to provide substantially a point of light.

Each light source is imaged on the recording medium 1 by a corresponding lens in a set of lenses 5*b*, 6*b*, 7*b* and 8*b* mounted on a common bracket 10. The light from the sources 5 to 8 is confined to a particular lens by an array of opaque parallel sheets 11, 12, 13, 14 and 15 extending between the sources 5 to 8 and the bracket 10. These sheets 11 to 15 are arranged to define light paths to the lenses 5*b* to 8*b* to prevent interference between adjoining light sources on the recording traces. The bracket 10 is spring-biased by a spring 16 and is periodically physically displaced, or vibrated, by a vibrator device 20. An auxiliary control signal input terminal 21 may be provided for the record drive 4 with a similar auxiliary terminal 22 for the vibrator 20 to provide for external synchronization of these elements.

In operation, the recording apparatus of the present invention is effective to produce a recording of the intensity of each of the light beams for the light sources 5 to 8. These light beams are each intensity modulated by the respective input signals on the input lines 5*a* to 8*a*. The vibration of the bracket 10 and the lenses 5*b* to 8*b* is operative to move the images of the light sources 5 to 8 across corresponding short transverse lines on the film 1. These record lines are limited at their ends by the light blocking effect of the sheets 11 to 15. The longitudinal motion of film 1 between the rollers 2, 3 is operative to cause each of the record lines to form a series of parallel lines in respective recording channels on the film 1.

The recording on the film 1 is a compressed record of the modulation of the light sources 5 to 8 since the motion of the lenses 5*b* to 8*b* provides a series of transverse recording lines in each channel having modulation information rather than simply a longitudinal recording trace as that produced by only moving the film. Thus, the recorded data is closely spaced with more efficient utilization of the surface of the film 1. Such a recording permits the data variations to be easily studied inasmuch as only a short length of the film 1 is needed for an extensive amount of recorded data with the recording channels having their recorded data aligned transversely on the film 1 to display concurrent relations therebetween.

While the present invention has been presented in the foregoing description with a continuously driven recording medium 1, it may be seen that various other modes of operation are possible without departing from the scope of the invention. For example, the film 1 may be intermittently driven by the record drive means 4 and the light sources 5 to 8 may each include signal gating circuits to produce a recording light beam only when the film 1 is stationary. Thus, the drive means 4 would be arranged to operate the gate circuits to turn off the light sources 5 to 8 when the film 1 was moving. Additionally, the vibrator 20 for the lens bracket 10 may be intermittently driven under control of an external control signal on terminal 22 to produce a lens motion concurrently with an external event during the time that the film 1 is stopped in its intermittent drive mode. For example, the movement of the bracket 10 could by synchronized with the sweep of a radar antenna to produce a recording of a received signal in a correlated point on the film 1 for trace to trace.

Another example of a modified mode of operation would be found in the use of a continuous film drive while gating circuits in the sources 5 to 8 are controlled by the record drive means 4 to produce a recording beam only during a preselected portion of the motion of the lens bracket 10 e.g., during the upward displacement thereof. The spring 16 would be used to return the bracket 10 while the gate circuits were disabled to prevent a recording.

Accordingly, it may be seen that there has been provided, in accordance with the present invention, a recording apparatus having a multiple channel recording capability while providing a compressed recording in each channel.

What is claimed is:

1. A recording apparatus comprising a recording beam source, a displaceable recording medium, a lens system arranged to produce an image of said source on said medium as a recording image and means operative to periodically displace said lens system whereby to sweep said recording image across said recording medium, said recording source including a plurality of light sources each having separate modulating signal input means and said lens system having a separate lens means for each of said light sources.

2. A recording apparatus as set forth in claim 1, wherein said last-mentioned means includes a vibrator arranged to mechanically oscillate said lens system.

3. A recording apparatus as set forth in claim 1, wherein said means to displace said lens system includes a vibrator means arranged to mechanically oscillate said lens systems.

4. A recording apparatus as set forth in claim 1, and including a synchronizing means arranged to operate said last-mentioned means concurrently with a displacement of said medium.

References Cited

UNITED STATES PATENTS

| | | | |
|---|---|---|---|
| 1,792,264 | 2/1931 | Alexanderson | 346—108 X |
| 1,597,487 | 8/1926 | St. Clair | 346—108 |
| 2,532,731 | 12/1950 | Potter | 346—107 X |
| 3,006,713 | 10/1961 | Klein et al. | |

RICHARD B. WILKINSON, *Primary Examiner.*

JOSEPH W. HARTARY, *Assistant Examiner.*

U.S. Cl. X.R.

346—108